Aug. 24, 1954  R. E. TILLEY  2,687,332
VEHICLE TRACK ADJUSTING MECHANISM
Filed Sept. 27, 1948  3 Sheets-Sheet 1
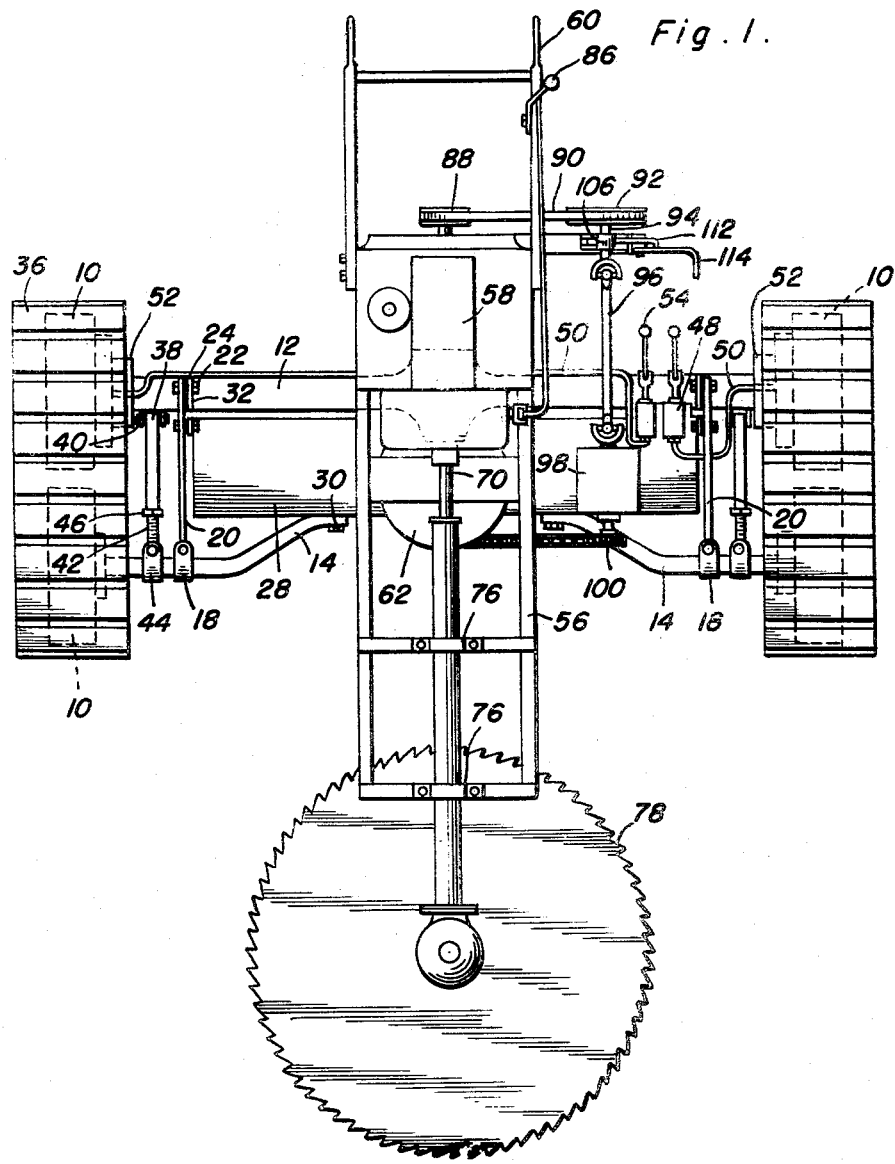
Ralph E. Tilley
INVENTOR.

Aug. 24, 1954 — R. E. TILLEY — 2,687,332
VEHICLE TRACK ADJUSTING MECHANISM
Filed Sept. 27, 1948 — 3 Sheets-Sheet 2
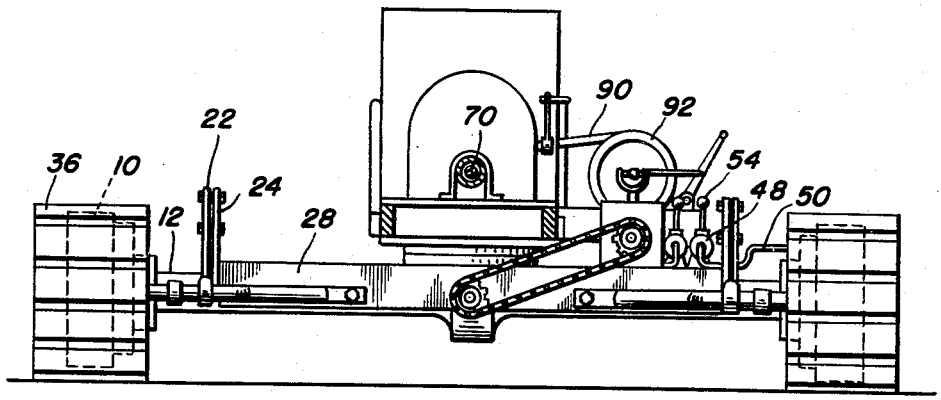
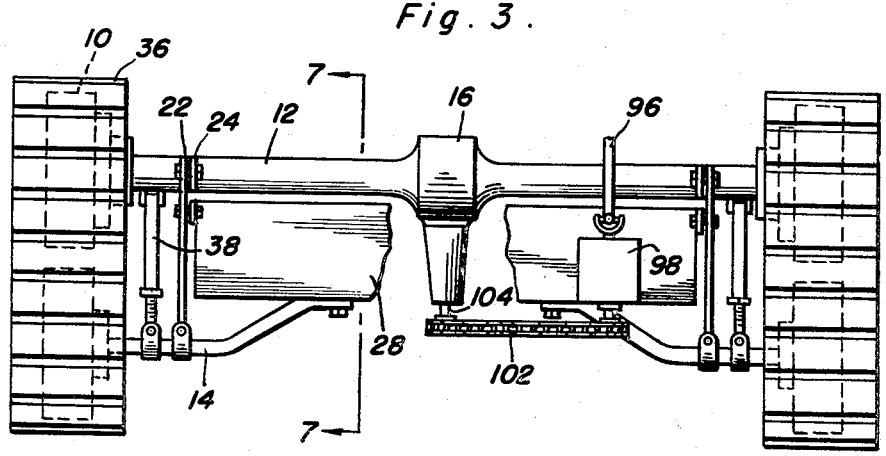
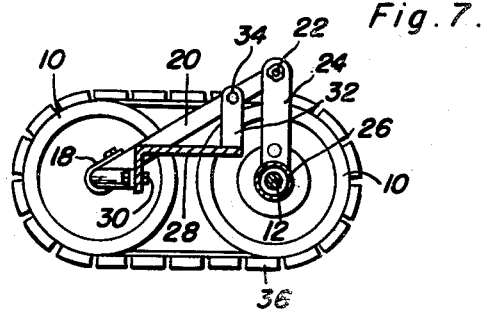
Ralph E. Tilley
INVENTOR.

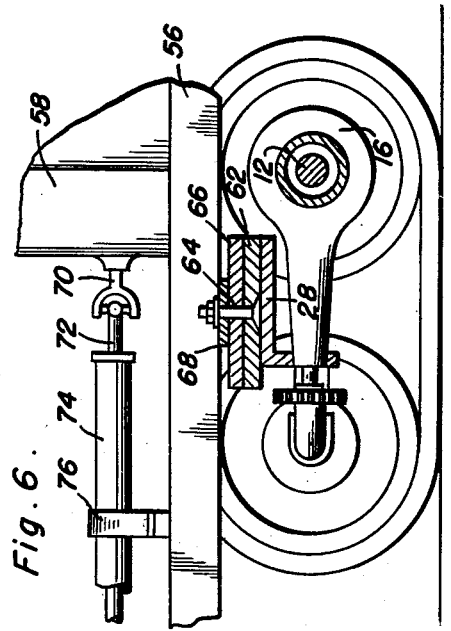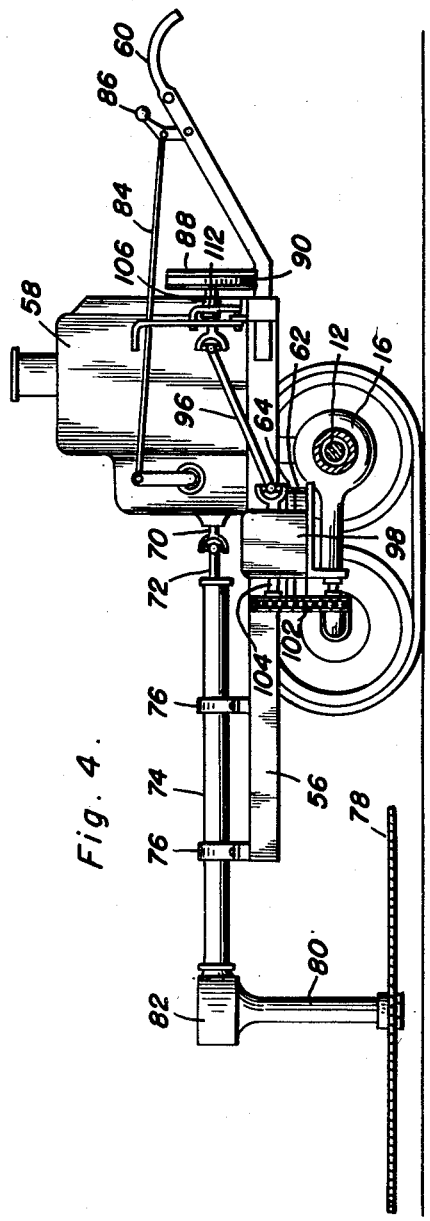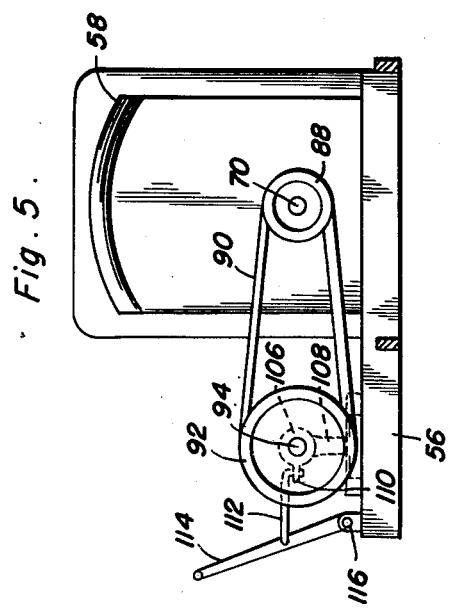

Patented Aug. 24, 1954

2,687,332

UNITED STATES PATENT OFFICE 2,687,332

VEHICLE TRACK ADJUSTING MECHANISM

Ralph E. Tilley, Weiner, Ark.

Application September 27, 1948, Serial No. 51,352

1 Claim. (Cl. 305—8)

This invention relates to a combination stump and tree saw which is propelled from place to place under its own power and has for its primary object the provision of a saw and motor assembly which is mounted on a turntable which is, in turn, mounted on a wheeled frame. The wheeled frame is provided with tracks and when brake means are applied to one of the tracks, the turntable will permit the rotating saw to cut the tree while the wheeled frame is relatively stationary.

A further object of this invention is to provide a self-propelled saw for cutting off the stumps of trees at the ground level with a maximum of efficiency and a minimum of effort.

A further object of this invention is to make the device of the character described in which the movement of the saw into cutting position is manually controllable.

Yet another object of this invention is to provide a combination stump and tree saw which includes a frame, a motor rotatably mounted on the frame, a cutter blade, means operatively connecting the cutter blade to the motor, wheels carried by the frame, tracks on the wheels, means for tightening the tracks, and means drivingly interconnecting the motor and the wheels.

These, together with various ancillary objects and features of the invention which will later become apparent as the following description proceeds, are attained by the device, a preferred embodiment of which has been illustrated by way of example only in the accompanying drawings, wherein:

Figure 1 is a top plan view of the device of the instant invention;

Figure 2 is an end elevational view of the device shown in Figure 1;

Figure 3 is a plan view of the wheeled frame with the saw removed;

Figure 4 is a side elevational view of the device;

Figure 5 is a side elevational view of the belt tightening mechanism;

Figure 6 is a vertical sectional view through the motor and saw support and the wheeled frame, some parts being shown in elevation; and Figure 7 is a sectional view taken substantially on the plane of section line 7—7 of Figure 3 and looking in the direction of the arrows.

Specific reference is now made to the drawings. In the several views in the accompanying drawings and in the following specification reference characters indicate corresponding elements throughout.

Indicated generally at 10 are wheels secured to a rear axle 12 and front axles 14. Intermediate its ends, the rear axle is provided with a conventional differential housing 16 in which is positioned the conventional differential gearing (not shown). Secured to the front axles by means of suitable collars 18 are upwardly and rearwardly inclined supports 20 which are pivoted as at 22 to a pair of vertical bars 24. The bars 24 are provided with sleeve members 26 which, as shown clearly in Figure 7, are rotatable on the rear axle 12.

A substantially inverted L-shaped frame member 28 is provided which is secured by means of bolts 30 at its forward end to the angulated front axle 14. Secured to the rear of the frame member is an upstanding bar 32 which is pivoted at its upper end to the support 20 as at 34.

Tracks 36 are entrained about the wheels 10 and a means is provided for tightening these tracks on the wheels. This means consists of a sleeve member 38, pivoted as at 40 to both ends of the rear axle 12. Engageably received in the sleeve 38 is an externally threaded screw 42 which is secured by means of a collar 44 to the front axle 14 adjacent the collar 18. A nut 46 is threadedly engaged with the screw 42 and rotatably mounted on the sleeve 38 for adjusting the overall length of the sleeve and screw. Thus, by adjusting the nut 46, the axles 12 and 14 can be moved a slight distance relative to each other to tighten the track about the wheels 10.

Suitably positioned upon the frame 28 at one end thereof is a pair of brake cylinders 48, preferably hydraulic, having lines 50 running from each to a brake 52 on each of the rear wheels. The cylinders 48 are actuated by conventional foot pedals or levers 54. Mounted upon a supporting frame 56 is a motor 58, the rear of said frame being provided with a pair of spaced parallel rearwardly inclined handles 60. This frame also supports the cutter blade as will be described hereinafter. The frame 56 is rotatably mounted upon the frame 28 in turntable fashion as follows. Secured centrally to the frame 28 is a circular plate 62 which is centrally apertured to receive a pivot pin 64. Rotatably mounted on the circular plate 62 is another circular plate 66 which is rotatable about the pivot pin 64 which is, in turn, secured by means of a spacer element 68 to the motor and cutter blade frame 56. Thus the entire motor and cutter blade frame 56 is rotatable upon the supporting frame 28.

The motor 58 is further provided with a driving shaft one end 70 of which is universally pivoted to a horizontal shaft 72 which is rotatable in a sleeve 74 retained upon the frame 56 by means of suitable collars 76. A horizontal cutter blade 78 is provided which is supported upon a vertical shaft rotatable in a vertical sleeve 80. The top of the sleeve 80 is provided with a housing 82 for retaining bevel gears (not shown) drivingly interconnecting the horizontal shaft 72 with the shaft supporting the cutter blade 78. The motor 58 is further provided with the conventional clutch (not shown) for actuating the engagement of the motor with the drive shaft 70, the clutch being provided with appropriate linkage 84 secured at one end to the handle 60 and operable by means of an appropriate lever 86.

The other end of the drive shaft 70 carries a sheave 88 about which is entrained an endless belt 90 which engages a second sheave 92 supported upon a stub shaft 94 which is, in turn, universally pivoted to a further shaft 96. The shaft 96 is pivoted at its forward end to a transmission 98. Extending from the transmission 98 is a shaft upon which is carried a sheave 100 over which is entrained an endless chain or belt 102 which engages a further sheave on a shaft 104 connected to the differential gearing on the rear axle 12. Thus, the motor is drivingly interconnected with the wheels.

To engage or disengage the motor from the wheels, a clutch in the form of a belt tightener is provided and consists of the following structural elements. About the stub shaft 94 is positioned a collar 106 supported upon a bracket 108, the bottom of which bracket is slidably mounted upon the frame member 56. The collar 106 is further provided with an apertured lug 110 in which is retained a link 112. A lever 114 is pivoted to the frame 56 as at 116 and is provided with an aperture intermediate its ends for receiving the free end of the link 112. Thus, if the lever 114 is pushed to the right on Figure 5, the belt 90 is loosened so that the motor is disengaged from the sheave 92 and eventually disengages from the wheels. When the lever 114 is moved to the left on Figure 5, the belt 90 is tightened and the motor is in engagement to drive the wheels 10.

Thus it will be seen that a saw is provided which is self-propelled, the propulsion of which is manually controlled by the operator, and which is also rotatably mounted in turntable fashion so that when any of the tracks or wheels are stopped, the saw, being horizontally rotatable upon the wheeled frame, can cut across a stump or a tree. It will further be seen that the rotation of the saw is manually controllable by means of a clutch mechanism and may be rotated at will independently of the movement of the wheeled frame.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claim.

Having described the invention, what is claimed as new is:

In a self propelled motor operated device, a supporting structure comprising front and rear axles, a rear axle housing, wheels on said axles, tracks entrained over said wheels, an upwardly and rearwardly inclined support secured on said front axle, a substantially vertical bar mounted on the rear axle housing, said support and said bar being pivotally connected, a sleeve pivotally connected to said rear axle, a nut rotatably mounted on said sleeve, a screw secured to the front axle, said nut engaging said screw for tensioning said track.

References Cited in the file of this patent

UNITED STATES PATENTS

| Number | Name | Date |
|---|---|---|
| 1,356,744 | Schmidt | Oct. 26, 1920 |
| 1,534,639 | Engleman et al. | Apr. 21, 1925 |
| 1,546,708 | Booth | July 21, 1925 |
| 2,082,600 | Squires et al. | June 1, 1937 |
| 2,224,757 | Wixson | Dec. 10, 1940 |
| 2,261,354 | Fee | Nov. 4, 1941 |
| 2,292,580 | Moyer et al. | Aug. 11, 1942 |
| 2,309,793 | Sedore et al. | Feb. 2, 1943 |
| 2,453,069 | Hutchings | Nov. 2, 1948 |
| 2,461,188 | Stoner | Feb. 8, 1949 |
| 2,462,314 | Fuqua | Feb. 22, 1949 |